Dec. 12, 1961  W. M. CADWALLADER ET AL  3,012,749
SEAT FOR GOLF CART
Filed March 14, 1961  2 Sheets-Sheet 1

INVENTORS.
William M. Cadwallader
Frank J. Perry, Jr.
BY Webb, Mackey & Burden

THEIR ATTORNEYS

Dec. 12, 1961 W. M. CADWALLADER ET AL 3,012,749
SEAT FOR GOLF CART
Filed March 14, 1961 2 Sheets-Sheet 2
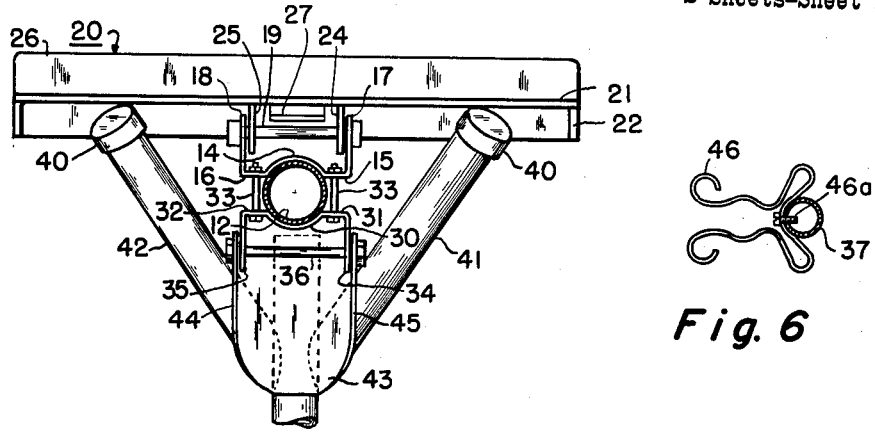
Fig. 5
Fig. 6
Fig. 7
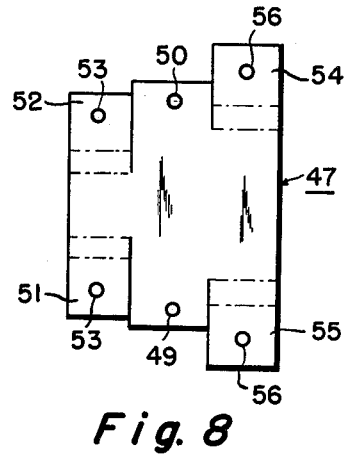
Fig. 8
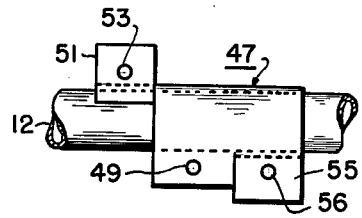
Fig. 9
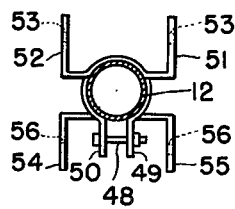
Fig. 10
INVENTORS.
William M. Cadwallader
Frank J. Perry, Jr.
BY Webb, Mackey + Burden
THEIR ATTORNEYS nited States Patent Office 3,012,749
Patented Dec. 12, 1961

3,012,749
SEAT FOR GOLF CART
William M. Cadwallader, 1543 Clairtonica St., and Frank J. Perry, Jr., 1240 Oakmont St., both of Pittsburgh, Pa.
Filed Mar. 14, 1961, Ser. No. 95,544
4 Claims. (Cl. 248—214)

Our invention is directed to a seat attachable to the handle of a golf bag cart. Many seats are known for use on golf bag carts, but each seat is particularly adapted for a specific golf bag cart rather than having universal application to all carts. Furthermore, many of the known seats are extremely complicated in construction and, therefore, are expensive. Our invention is extremely simple in construction, has relatively few moving parts, and is sufficiently rugged to support a substantial weight in use. Furthermore, our seat has universal application to a wide variety of golf carts and also functions as a holder for a golf score card and pencil easily accessible on the cart.

Our seat does not interfere with the normal use of the cart or the collapsing character of the cart.

In the drawings, we have described a present preferred embodiment of our invention in which:

FIGURE 5 is an enlarged cross section taken on line V—V of FIGURE 2;

FIGURE 6 is an enlarged cross section taken on line VI—VI of FIGURE 2;

FIGURE 7 is an enlarged cross section taken on line VII—VII of FIGURE 4;

FIGURE 8 is a bracket blank for a second form of our invention;

FIGURE 9 is a side elevation view of the bracket of the second form of our invention; and FIGURE 10 is a front elevation view of the bracket of the second form of our invention.

Briefly, the present invention includes a bracket attached to the handle of the golf bag cart and having a swingably mounted seat affixed to the upper side of the bracket and a swingably mounted leg affixed to the underside of the bracket. The leg is positioned immediately below the seat when in use such that the weight of the person using the seat is supported directly by the leg without causing a strain on the pivotal connections.

Figure 1:
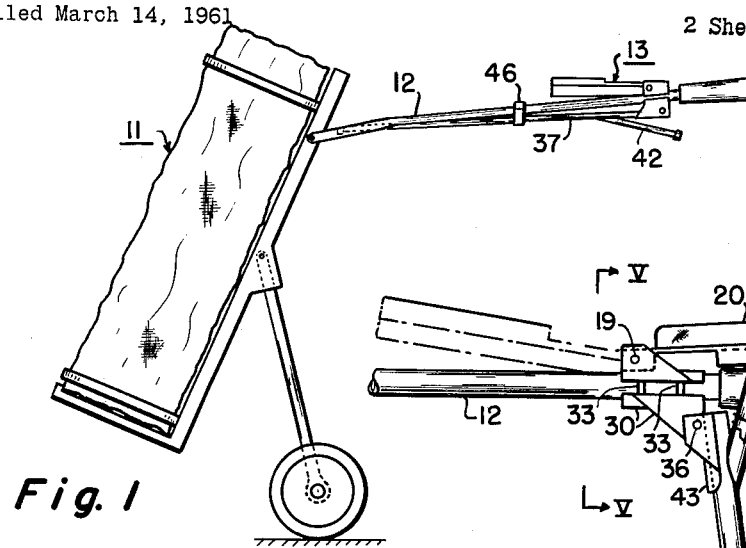
FIGURE 1 is a side elevation of our invention attached to a golf bag cart in the withdrawn position.

Referring specifically to the drawings, a conventional golf cart 11 has a handle 12 extending rearwardly from the cart. Our invention 13 is affixed to handle 12. FIGURE 1 shows our invention swung up to a position immediately adjacent the handle when not in use as a seat.

Specifically, our invention includes a bracket affixed to the handle 12 and having an upper half with a semicircular center 14 with its open side facing downward and outwardly directed flanges 15 and 16 affixed to each side of the center 14 and upwardly directed flanges 17 and 18 affixed to the flanges 15 and 16 respectively. Each of the flanges 15 and 16 has a pair of spaced holes therein for receiving bolts in a manner to be described hereinafter. Each upwardly directed flange 17 and 18 has a hole which receives a bolt 19 upon which a seat 20 is swingably mounted. The bolt 19 is positioned in the holes of flanges 17 and 18 and a nut is threaded on the bolt to retain it in position.

The seat 20 includes a flat plate 21 having folded-down peripheral edges 22 for strength and a rearwardly projecting portion 23 having turned-down flanges 24 and 25. Each flange 24 and 25 has a hole in which the bolt 19 is positioned to swingably mount the plate 21 on the upper half of the bracket.

A foam rubber cushion 26 is preferably affixed to the upper side of plate 21.

A clip 27 is punched downwardly from the plate 21 as shown in FIGURE 7. The clip 27 holds a golf score sheet 28 and a pencil 29. Thus, when the seat is swung to the dash line position shown in FIGURE 2, the score sheet 28 and pencil 29 are readily accessible to a golfer for recording his score. When the seat is swung to the position shown in solid lines in FIGURES 2 and 3, the golfer can sit on the seat.

Figure 2:
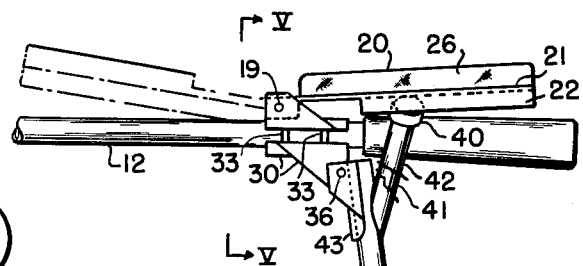
FIGURE 2 is a side elevation view of our invention with the seat in position for use.
Figure 3:
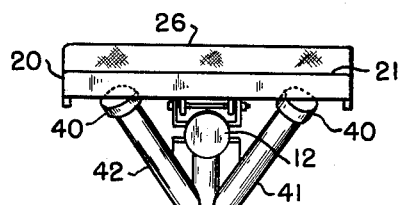
FIGURE 3 is a front elevation view of our invention with the seat in position for use.
Figure 4:
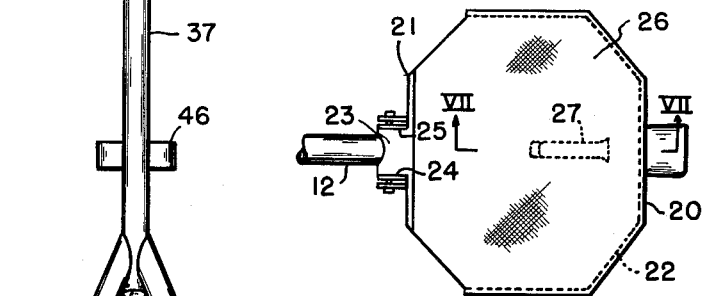
FIGURE 4 is a plan view of our invention with parts removed for clarity and the seat in position for use.

The lower half of the bracket has a semicircular center 30 with its open side facing upward and outwardly directed integral flanges 31 and 32 affixed to each side of the center 30 and downwardly directed flanges 34 and 35 affixed to the flanges 31 and 32 respectively. Each flange 31 and 32 has a pair of spaced holes which receive bolts 33 which also pass through the holes in flanges 15 and 16 to rigidly clamp the bracket to the handle 12, as shown in FIGURES 2 and 5. Nuts are tightly threaded on each bolt to insure a rigid connection.

Each flange 34 and 35 has an opening through which a bolt 36 passes and a nut is threaded on the end of the bolt. The leg is swingably mounted on bolt 36.

Both the upper and lower halves of the bracket are substantially identical in construction and are mounted in face-to-face relationship to each other around the handle 12 of the cart.

A main leg 37, preferably fabricated from ¾" diameter steel tubing suitably treated to prevent corrosion, has a bifurcated lower end, having two integral outwardly and downwardly directed legs 38 and 39. Preferably, these legs are at an angle of 24 degrees from the vertical as viewed in FIGURE 3 and have plastic or metal caps 40 on the lower end to seal the tubings. Preferably, the legs 38 and 39 are welded to the main leg 37.

The upper end of the main leg 37 is also bifurcated into two legs 41 and 42. Thes legs 41 and 42 are preferably located 36 degrees from the vertical, as viewed in FIGURE 3, and about 33 degrees from the center axis of tube 37, as viewed in FIGURE 2. The upper ends of the legs 41 and 42 have plastic or metal caps 40 to seal the ends.

A pivoting bracket 43 is welded to the upper end tube 37 and has a pair of rearwardly extending flanges 44 and 45. Each of these flanges has a hole through which the bolt 36 passes, thereby swingably mounting the entire leg about the bolt 36 relative to the handle 12.

A spring steel clip 46 of well-known construction is affixed to the tube 37 by a metal screw 46a positioned in a threaded hole in the tube 37. The clip 46 maintains the leg in the upper position, as shown in FIGURE 1, by releasably engaging the handle 12. The leg is swung to the downward position by merely grasping leg 41 or 42 and disengaging clip 46 from handle 12.

It should be particularly noted that, when the leg 37 is in the downward position, as shown in FIGURE 2, its point of engagement with the earth is at approximately the midpoint of the plate 21. Thus, when a person is seated on the plate 21, the person's weight is transmitted directly to the earth by way of legs 41, 42, 37, 38 and 39 rather than through the pivot bolts 36 and 19. This particular arrangement results in a very rugged structure which will withstand repeated use without malfunction. The legs 41 and 42 engage the middle of the underside of plate 21.

FIGURES 8 to 10 disclose a modified form of bracket which is stamped from a single piece of metal 47, as shown in FIGURE 8. This bracket is bent in a circular configuration, as shown in FIGURE 10, and a clamping bolt 48 is positioned through holes 49 and 50 to rigidly clamp the bracket to the handle 12 of the cart. A pair of upwardly directed flanges 51 and 52 has aligned openings 53 therein which receive the bolt 19 for swingably mounting the seat relative to the bracket. A pair of downwardly directed flanges 54 and 55 has aligned openings 56 therein which receive the bolt 36 for swingably mounting the leg 37 relative to the bracket. When using the bracket of FIGURES 8–10, the remaining construction of the seat is identical to that disclosed above.

While we have described a presently preferred embodiment of our invention, it may be otherwise embodied within the scope of the following claims.

We claim:

1. A seat attachable to a handle of a golf bag cart; including a bracket detachably affixed to said handle; a seat pivotally mounted to the upper side of the bracket; a downwardly extending leg pivotally mounted to the underside of the bracket; said leg extending from the handle to the earth to support a person on the seat, and a portion of the leg extending upward above said bracket into engagement with the underside of said seat.

2. A seat according to claim 1 wherein said bracket includes a portion extending around the handle of the cart, fastening means to immovably engage said portion with the handle, a pair of integral ears on the upper side of said bracket, one end of said seat being pivotally mounted to the ears, said seat being pivotal from a first position overlying said leg to a second position 80 degrees from the first position to locate the underside of the seat in an upwardly facing position, and means on said underside of the seat to hold a golf score card.

3. A seat according to claim 1 wherein said bracket includes an upper portion having a U-shaped center conforming to the shape of the top side of the handle, and an outwardly extending L-shaped flange affixed to each side of the center; one of the legs of each flange being affixed to the center and having an opening, the other leg of each flange being affixed upwardly to said one leg and having an opening, the openings in said other legs being in alignment; a lower portion of the bracket having a U-shaped center having its open side facing upward and conforming to the shape of the bottom side of the handle; the U-shaped centers on said upper and lower portions being placed in face-to-face relationship to each other and encircling said handle; a lower outwardly extending L-shaped flange affixed to each side of the lower U-shaped center, one of the legs of each lower flange being affixed to said center of the lower portion and the other leg being affixed downwardly to said one leg, openings in each of the last-mentioned legs; the opening in each of said one legs of the lower portion being in alignment with an opening in each of said one legs of the upper portion, connecting means positioning in and between said aligned openings and firmly clamping said upper and lower portions to said handle; said seat being positioned above said handle and having a pair of integral downwardly directed ears, an opening in each ear in alignment with the openings in said other legs of the upper portion of the bracket, connecting means positioned in the last-mentioned aligned openings and pivoting said ears relative to said other legs of the upper portion of the bracket; said leg including a central elongated member having a bifurcated lower end which engages the earth, and a bifurcated upper end engageable with the underside of said seat; rearwardly extending flanges affixed to the upper end of said member, openings in said flanges in alignment with the openings in the other legs of the lower portion of the bracket; and connecting means positioned in the last-mentioned aligned openings and pivoting said leg relative to said bracket.

4. A seat according to claim 1 including an integral clip on said leg, said clip being engageable with said handle when said leg is pivoted upwardly to a noninterfering position and the clip maintaining the leg in said position.

References Cited in the file of this patent
UNITED STATES PATENTS

| | | |
|---|---|---|
| 2,599,928 | Lyons | June 10, 1952 |
| 2,879,831 | Williamson | Mar. 31, 1959 |
| 2,944,593 | Zarnke | July 12, 1960 |